(12) United States Patent
Nichols et al.

(10) Patent No.: US 9,024,722 B2
(45) Date of Patent: May 5, 2015

(54) REMOTE IDENTIFICATION EQUIPPED SELF-SERVICE MONETARY ITEM HANDLING DEVICE

(75) Inventors: Michelle Nichols, Rock Hill, SC (US); Todd Atwood, Charlotte, NC (US); James Heddleson, Charlotte, NC (US); Karen Garnett, St. Louis, MO (US); Elizabeth Votaw, Potomac, MD (US); Steve Crowley, Twin Falls, ID (US)

(73) Assignee: Bank of America Corporation, Charlotte, NC (US)

( * ) Notice: Subject to any disclaimer, the term of this patent is extended or adjusted under 35 U.S.C. 154(b) by 800 days.

(21) Appl. No.: 12/262,529

(22) Filed: Oct. 31, 2008

(65) Prior Publication Data

US 2009/0309694 A1 Dec. 17, 2009

Related U.S. Application Data

(60) Provisional application No. 61/061,987, filed on Jun. 16, 2008.

(51) Int. Cl.
*G05B 19/00* (2006.01)
*G07C 9/00* (2006.01)
*G06Q 20/02* (2012.01)
(Continued)

(52) U.S. Cl.
CPC ............ *G07C 9/00182* (2013.01); *G06Q 20/02* (2013.01); *G06Q 20/389* (2013.01); *G07F 19/20* (2013.01); *G07F 19/207* (2013.01); *G07F 19/211* (2013.01)

(58) Field of Classification Search
CPC .......... G07D 11/0096; G07D 11/0006; G07D 11/0018; G07D 11/0066; G07D 11/0081; G07D 11/0087; G07D 1/00; G06Q 10/087; G06Q 20/105; G06Q 20/327; G06Q 20/382; G07F 19/20; G07F 19/201
USPC ......... 340/5.8, 5.81, 5.85; 235/379, 380, 382; 705/39, 43, 44
See application file for complete search history.

(56) References Cited

U.S. PATENT DOCUMENTS

| | | | |
|---|---|---|---|
| 3,618,059 A | | 11/1971 | Allen |
| 4,352,097 A | | 9/1982 | Hamann |
| 4,443,692 A | * | 4/1984 | Nishimura ................... 235/379 |

(Continued)

FOREIGN PATENT DOCUMENTS

| | | |
|---|---|---|
| DE | 4019265 | 11/1991 |
| DE | 4429815 | 2/1996 |

(Continued)

OTHER PUBLICATIONS

Final Office in U.S. Appl. No. 12/263,041 dated Jan. 26, 2011.

(Continued)

*Primary Examiner* — George A Bugg
*Assistant Examiner* — Paul Obiniyi
(74) *Attorney, Agent, or Firm* — Banner & Witcoff, Ltd.; Michael A. Springs (57) ABSTRACT

An electronic process to capture, track and monitor unique identifying information regarding automated teller machine (ATM) deposits. ATMs equipped with radio-frequency identification (RFID) or other remote identification technology may enable the electronic transfer of key data elements to general ledger and asset tracking processing systems.

15 Claims, 5 Drawing Sheets

(51) Int. Cl.
*G06Q 20/38* (2012.01)
*G07F 19/00* (2006.01)

(56) References Cited

U.S. PATENT DOCUMENTS

| | | | |
|---|---|---|---|
| 5,453,601 A | 9/1995 | Rosen | |
| 5,689,240 A | 11/1997 | Traxler | |
| 5,748,908 A * | 5/1998 | Yu | 705/44 |
| 5,936,220 A | 8/1999 | Hoshino et al. | |
| 5,952,639 A | 9/1999 | Ohki et al. | |
| 5,952,920 A | 9/1999 | Braddick | |
| 5,953,423 A | 9/1999 | Rosen | |
| 5,963,131 A | 10/1999 | D'Angelo et al. | |
| 6,028,517 A | 2/2000 | Sansone et al. | |
| 6,047,807 A | 4/2000 | Molbak | |
| 6,055,438 A * | 4/2000 | Winner, Jr. | 455/521 |
| 6,122,625 A | 9/2000 | Rosen | |
| 6,167,378 A | 12/2000 | Webber, Jr. | |
| 6,255,947 B1 * | 7/2001 | Osawa et al. | 340/568.7 |
| 6,260,024 B1 | 7/2001 | Shkedy | |
| 6,483,433 B2 | 11/2002 | Moskowitz et al. | |
| 6,487,542 B2 * | 11/2002 | Ebata et al. | 705/69 |
| 6,491,216 B1 * | 12/2002 | May | 235/375 |
| 6,498,603 B1 * | 12/2002 | Wallace | 345/177 |
| 6,526,273 B1 * | 2/2003 | Link et al. | 455/406 |
| 6,633,881 B2 | 10/2003 | Drobish et al. | |
| 6,736,314 B2 | 5/2004 | Cooper et al. | |
| 6,788,203 B1 | 9/2004 | Roxbury et al. | |
| 6,845,905 B2 | 1/2005 | Blad et al. | |
| 7,004,385 B1 * | 2/2006 | Douglass | 235/379 |
| 7,015,814 B2 * | 3/2006 | Ireland et al. | 340/572.1 |
| 7,042,360 B2 | 5/2006 | Light et al. | |
| 7,076,458 B2 | 7/2006 | Lawlor et al. | |
| 7,143,933 B2 * | 12/2006 | Uematsu et al. | 235/379 |
| 7,149,336 B2 | 12/2006 | Jones et al. | |
| 7,201,313 B1 * | 4/2007 | Ramachandran | 235/379 |
| 7,212,992 B1 | 5/2007 | Kanevsky et al. | |
| 7,216,800 B1 * | 5/2007 | Ramachandran | 235/379 |
| 7,243,080 B2 | 7/2007 | Bhadra | |
| 7,248,160 B2 | 7/2007 | Mangan et al. | |
| 7,284,692 B1 * | 10/2007 | Douglass | 235/379 |
| 7,348,886 B2 | 3/2008 | Himberger et al. | |
| 7,350,230 B2 * | 3/2008 | Forrest | 726/9 |
| 7,375,638 B2 | 5/2008 | Light et al. | |
| 7,461,780 B2 * | 12/2008 | Potts et al. | 235/380 |
| 7,474,217 B2 | 1/2009 | Himberger et al. | |
| 7,537,153 B2 | 5/2009 | Hurwitz et al. | |
| 7,577,612 B2 * | 8/2009 | Waller et al. | 705/43 |
| 7,623,033 B2 | 11/2009 | Ainsworth et al. | |
| 7,659,816 B2 | 2/2010 | Wandel | |
| 7,714,708 B2 | 5/2010 | Brackmann et al. | |
| 7,719,423 B2 | 5/2010 | Himberger et al. | |
| 7,748,610 B2 | 7/2010 | Bell et al. | |
| 7,778,456 B2 | 8/2010 | Jones et al. | |
| 7,883,005 B2 * | 2/2011 | Artino et al. | 235/379 |
| 7,908,188 B2 | 3/2011 | Flynn et al. | |
| 7,965,184 B1 * | 6/2011 | Nichols et al. | 340/568.7 |
| 7,975,911 B2 * | 7/2011 | Artino et al. | 235/379 |
| 8,078,534 B1 * | 12/2011 | Nichols et al. | 705/39 |
| 8,164,451 B2 * | 4/2012 | Nichols et al. | 340/568.7 |
| 2001/0051922 A1 * | 12/2001 | Waller et al. | 705/43 |
| 2001/0054643 A1 | 12/2001 | Siemens | |
| 2002/0052193 A1 * | 5/2002 | Chetty | 455/412 |
| 2002/0052794 A1 | 5/2002 | Bhadra | |
| 2002/0091937 A1 * | 7/2002 | Ortiz | 713/200 |
| 2002/0095588 A1 * | 7/2002 | Shigematsu et al. | 713/186 |
| 2002/0111916 A1 | 8/2002 | Coronna et al. | |
| 2002/0138424 A1 * | 9/2002 | Coyle | 705/39 |
| 2002/0194122 A1 | 12/2002 | Knox et al. | |
| 2002/0195309 A1 * | 12/2002 | Pope | 194/217 |
| 2003/0011466 A1 | 1/2003 | Samuel et al. | |
| 2003/0050891 A1 | 3/2003 | Cohen | |
| 2003/0061153 A1 | 3/2003 | Birdsong et al. | |
| 2003/0083936 A1 * | 5/2003 | Mueller et al. | 705/14 |
| 2003/0122671 A1 | 7/2003 | Jespersen | |
| 2003/0163710 A1 * | 8/2003 | Ortiz et al. | 713/186 |
| 2003/0177102 A1 * | 9/2003 | Robinson | 705/75 |
| 2003/0208431 A1 | 11/2003 | Raynes et al. | |
| 2003/0213843 A1 * | 11/2003 | Jackson | 235/382 |
| 2003/0234719 A1 | 12/2003 | Denison et al. | |
| 2004/0016796 A1 * | 1/2004 | Hanna et al. | 235/375 |
| 2004/0056767 A1 | 3/2004 | Porter | |
| 2004/0083149 A1 | 4/2004 | Jones | |
| 2004/0100379 A1 | 5/2004 | Boman et al. | |
| 2004/0111346 A1 | 6/2004 | Macbeath et al. | |
| 2004/0124966 A1 * | 7/2004 | Forrest | 340/5.8 |
| 2004/0201454 A1 | 10/2004 | Waterhouse et al. | |
| 2005/0027594 A1 | 2/2005 | Yasnovsky et al. | |
| 2005/0077347 A1 * | 4/2005 | Uematsu et al. | 235/379 |
| 2005/0091129 A1 | 4/2005 | Tien | |
| 2005/0108164 A1 | 5/2005 | Solafia, III et al. | |
| 2005/0183928 A1 | 8/2005 | Jones et al. | |
| 2005/0258234 A1 | 11/2005 | Silverbrook et al. | |
| 2005/0273347 A1 | 12/2005 | Dudley et al. | |
| 2006/0131395 A1 * | 6/2006 | Potts et al. | 235/380 |
| 2006/0247973 A1 * | 11/2006 | Mueller et al. | 705/14 |
| 2006/0271441 A1 * | 11/2006 | Mueller et al. | 705/14 |
| 2006/0282277 A1 | 12/2006 | Ng | |
| 2006/0288233 A1 * | 12/2006 | Kozlay | 713/186 |
| 2007/0005452 A1 | 1/2007 | Klingenberg et al. | |
| 2007/0008118 A1 | 1/2007 | Kassiedass | |
| 2007/0012602 A1 | 1/2007 | Baldassari et al. | |
| 2007/0034693 A1 | 2/2007 | Jouvin et al. | |
| 2007/0063016 A1 | 3/2007 | Myatt et al. | |
| 2007/0174156 A1 | 7/2007 | Emde et al. | |
| 2007/0198341 A1 | 8/2007 | Park | |
| 2007/0226142 A1 * | 9/2007 | Hanna et al. | 705/41 |
| 2007/0282724 A1 | 12/2007 | Barnes et al. | |
| 2008/0005019 A1 | 1/2008 | Hansen | |
| 2008/0005578 A1 * | 1/2008 | Shafir | 713/186 |
| 2008/0103959 A1 | 5/2008 | Carroll et al. | |
| 2008/0120237 A1 * | 5/2008 | Lin | 705/44 |
| 2008/0126515 A1 | 5/2008 | Chambers et al. | |
| 2008/0149706 A1 | 6/2008 | Brown et al. | |
| 2008/0155269 A1 * | 6/2008 | Yoshikawa | 713/186 |
| 2008/0199155 A1 | 8/2008 | Hagens et al. | |
| 2008/0223930 A1 * | 9/2008 | Rolland et al. | 235/385 |
| 2008/0249934 A1 | 10/2008 | Purchase et al. | |
| 2008/0262949 A1 | 10/2008 | Bond et al. | |
| 2008/0265019 A1 * | 10/2008 | Artino et al. | 235/379 |
| 2008/0303903 A1 | 12/2008 | Bentley et al. | |
| 2009/0006249 A1 | 1/2009 | Morgan et al. | |
| 2009/0006250 A1 | 1/2009 | Bixler et al. | |
| 2009/0032580 A1 | 2/2009 | Blachowicz et al. | |
| 2009/0051566 A1 | 2/2009 | Olsen et al. | |
| 2009/0051769 A1 | 2/2009 | Kuo et al. | |
| 2009/0065573 A1 * | 3/2009 | Potts et al. | 235/379 |
| 2009/0107800 A1 * | 4/2009 | Nishida et al. | 194/302 |
| 2009/0114716 A1 * | 5/2009 | Ramachandran | 235/379 |
| 2009/0164364 A1 | 6/2009 | Galit et al. | |
| 2009/0187482 A1 | 7/2009 | Blount et al. | |
| 2009/0216662 A1 | 8/2009 | Crist et al. | |
| 2010/0052844 A1 * | 3/2010 | Wesby | 340/5.7 |
| 2010/0076853 A1 | 3/2010 | Schwarz | |
| 2010/0274723 A1 * | 10/2010 | Joao | 705/44 |
| 2011/0089230 A1 * | 4/2011 | Artino et al. | 235/379 |
| 2011/0089231 A1 * | 4/2011 | Artino et al. | 235/379 |

FOREIGN PATENT DOCUMENTS

| | | |
|---|---|---|
| DE | 19512045 | 10/1996 |
| DE | 19846452 | 12/1999 |
| DE | 20013021 | 11/2000 |
| DE | 102004039365 | 2/2006 |
| DE | 102005047711 | 4/2007 |
| EP | 1477949 | 11/2004 |
| GB | 2304953 | 3/1997 |
| WO | 9933040 | 7/1999 |
| WO | 03034359 | 4/2003 |
| WO | 2005041385 | 5/2005 |
| WO | 2005106722 | 11/2005 |

OTHER PUBLICATIONS

Final Office in U.S. Appl. No. 12/262,448 dated Feb. 1, 2011.

(56) References Cited

OTHER PUBLICATIONS

Non-final Office in U.S. Appl. No. 12/262,522 dated Feb. 3, 2011.
Final Office in U.S. Appl. No. 12/262,432 dated Dec. 7, 2010.
Powerpoint Presentation, DTS Product Overview, IFS, Apr. 2006, 17 pages.
Durbin, "Ford's F-150 goes high-tech", retrieved from <http://www.wheels.ca/article/173134>, Feb. 6, 2008, 4 pages.
Monthly Minutes from Banking Technology Operations Standing Committee (BTO), dated Mar. 20, 2007, 2 pages.
Hem, "Adaptation/Loomis cashes in on technology/The armored car company defies obsolescence despite a declining use of coins and bills", Houston Chronicle, retrieved from <http://www.chron.com/CDA/archives/archive.mpl?id=2008_4523451>, Mar. 1, 2008, 2 pages.
Powerpoint Presentation, Guck, "PakTrak", Cash Shipment Package Tracking Concept Overview, Draft-Version 1.0, Mar. 14, 2008, 17 pages.
Powerpoint Presentation, RFID in Banking, May 21, 2008, 12 pages.
Monthly Minutes for RFIS SIG dated Mar. 19, 2008, 2 pages.
Office Action from related U.S. Appl. No. 12/262,534 dated Jun. 24, 2010.
Office Action from related U.S. Appl. No. 12/263,041 dated Mar. 12, 2010.
Office Action from related U.S. Appl. No. 12/262,908 dated Mar. 8, 2010.
Final Office Action for U.S. Appl. No. 12/262,908 dated Aug. 18, 2010.
Non-Final Office Action for U.S. Appl. No. 12/262,432 dated Aug. 18, 2010.
Non-Final Office Action for U.S. Appl. No. 12/263,041 dated Sep. 2, 2010.
European Search Report in EP09007879 dated Oct. 1, 2009.
European Search Report in EP09007878 dated Oct. 1, 2009.
International Search Report and Written Opinion for PCT/US2009/047452, mailed Aug. 25, 2009.
Non-Final Office Action for U.S. Appl. No. 12/262,448 dated Sep. 15, 2010.
Non-Final Office Action for U.S. Appl. No. 12/262,526 dated Sep. 16, 2010.
Non-Final Office Action for U.S. Appl. No. 12/262,472, dated Oct. 18, 2010.
Non-Final Office Action for U.S. Appl. No. 12/262,534, dated Oct. 14, 2010.
Non-Final Office Action in U.S. Appl. No. 12/262,523 dated Nov. 9, 2010.
Final Office Action in U.S. Appl. No. 12/262,526 dated Nov. 23, 2010.
Non-Final Office Action in U.S. Appl. No. 12/262,928 dated Nov. 10, 2010.
Non-Final Office Action in U.S. Appl. No. 12/263,115 dated Nov. 16, 2010.
Non-Final Office Action in U.S. Appl. No. 12/262,532 dated Nov. 26, 2010.
Notice of Allowance in U.S. Appl. No. 12/262,502 dated Oct. 19, 2010.
PR Newswire: "Airborne Express Announces New Pricing": New York, Jan. 29, 2001.
Anonymous; "Parcel Pickup now a click away at Canada Post"; Canada Newswire, Aug. 31, 2011.
Oracle Database SQL Reference, 10g Release 1 (10.1), Part No. B10759-01, Dec. 2003.

\* cited by examiner

REMOTE IDENTIFICATION EQUIPPED SELF-SERVICE MONETARY ITEM HANDLING DEVICE

CROSS-REFERENCE TO RELATED APPLICATIONS

This application claims priority to U.S. provisional patent application Ser. No. 61/061,987, filed Jun. 16, 2008, entitled "Cash Supply Chain Improvements," hereby incorporated herein by reference as to its entirety.

BACKGROUND

The cash supply chain is manual, complex, has inherent risk issues, and is dispersed throughout a network of self-service cash handling devices such as automatic teller machines (ATMs), as well as cash vaults and banking centers. The costs of depositing, distributing, and managing cash across a major bank, as well as the amount of daily excess cash carried by such a bank, can be substantial.

Today's client deposit process does not adequately allow clients and internal cash supply chain processing units to view the status of client deposits as the deposits move from deposit site through asset verification and credit. Deposit bags are handled multiple times in the current process (and possibly by many different parties), which increases potential errors and complicates finding missing deposits or understanding where errors occurred and assigning fiduciary responsibility for those errors. Pertinent pieces of deposit data are typically manually entered and reentered into front-end systems throughout the end-to-end process. The collaboration and sharing of information across multiple organizations and with multiple vendors may make this process very complex and increases risk to the bank and bank clients.

In addition, self-service cash handling devices have improved the clearing speed of checks, enabled cost reductions and delighted customers with deposit photo receipts and immediate funds available for check and cash deposits. However, servicing and processing of self-service cash handling device deposits is an extremely manual process, is labor intensive and time consuming, and provides multiple opportunities for errors that directly impact bank customers and banking center associates. Currently, self-service cash handling device technology and operations do not have electronic tracking and monitoring of cash and check bags from self-service cash handling device deposit pull servicing through asset verification and check storage. Handling of contents from cash and check bags involve manual chain of custody, cash verification and reconciliation processing. Valuable pieces of information are re-keyed into general ledger, cash vault asset management tracking and image check filing and retrieval systems. Data that is relied upon is in paper receipt format, hand written on bags or is non-existent for cash verification and reconciliation.

SUMMARY

Aspects as described herein are directed to tracking monetary packages, which may contain monetary items such as foreign and domestic government-issued legal-tender paper currency, coins, checks, coupons, food stamps, credit cards, negotiable money orders, and/or other negotiable instruments as well as non-negotiable collateral information, throughout the cash supply chain. In carrying out daily financial transactions, it is typical for monetary packages to be physically transferred between various parties, such as but not limited to a bank client (or a client of another financial institution who is leveraging the services of the bank), a transporter (e.g., an armored carrier), a bank vault, and even various stations within a bank vault. This transfer amongst various parties is referred to as the cash supply chain. Because many types of cash are reusable/recyclable, the same physical cash is usually cycled through the cash supply chain multiple times.

For transport through the cash supply chain, a financial transaction such as a deposit including one or more monetary items is normally bundled or otherwise packaged together as a monetary package. Depending upon the location within the cash supply chain, the monetary package may maintain together a quantity of cash as a single entity by way of, e.g., a bag (in which the monetary items are placed within the bag, which may be sealed), by way of a cassette for holding cash, and/or by way of one or more straps (which may also be within the bag).

While a number of techniques to automate transaction handling have been attempted, there remains a need to increase the efficiency and accuracy of the financial transaction process. Consequently, it is desirable to increase the speed and accuracy of the financial transactions and to reduce the labor required to perform the transactions. It is also desirable to make information relating to the financial transaction rapidly available to the client, third party vendors, and the bank, and to identify more quickly problematic locations in the financial transaction, identify potential fraud or embezzlement, and identify industry trends. Information about a deposit or withdrawal, for instance, should be provided in an expeditious fashion as it is processed along a cash supply chain, where notification/reporting is customizable and automatic for enhancing the client's experience and for improving internal processes of a bank.

According to further aspects, monetary packages are tracked via a centralized tracking system that communicates with the various parties handling the monetary packages throughout the entire supply chain and/or when a carrier is set to arrive. Each time a monetary package changes status in the cash supply chain (e.g., transfers from one party to another or changes physical location), an involved party (e.g., the party receiving the monetary package and/or the party providing the monetary package) updates the centralized tracking system with the status. The centralized tracking system may be updated using a network of automated sensors that do not necessarily require the intervention of a party to create the update. These updates may be communicated to the centralized tracking system (system of record) in real time or near real time. Such a centralized tracking system may allow the bank or other service provider to offer a variety of services to the client.

For instance, centralized monetary package tracking may allow for more accurate reporting of monetary package status. And, by pre-scheduling (initiation) of deposits and change orders into the centralized tracking system, anomalies in the transport of a monetary package (e.g., a lost or delayed monetary package) may be recognized much earlier, even prior to actual deposit credit or arrival of the package at the processing site.

Still further aspects are directed to an electronic process to capture, track and monitor unique identifying information regarding check and bags deposited with a self-service monetary item handling device throughout processing, verification, reconciliation, storage and retrieval of bag contents. Self-service monetary item handling devices equipped with radio-frequency identification (RFID) or other remote identification technology may enable the electronic transfer of key data elements to general ledger and asset tracking processing systems. The term "self-service monetary item handling device" as used herein is intended to broadly refer to any self-service devices as found in the financial services and banking industries that can handle monetary items, including but not limited to automated teller machines (ATMs) such as deposit image enabled ATMs, full function envelope ATMs, and cash dispense ATMs; cash recyclers; deposit kiosks; night drops such as receipted night drops; and lock boxes.

By introducing RFID technology into the self-service monetary item handling device process, new tracking and monitoring capabilities may be provided, potentially allowing the bank to view the status of a deposit bag as "In Transit," "Received," and/or other status designations as the deposit moves through the deposit verification process. The bank may have tools to control access to the deposit, find and retrieve paper checks, and pull deposits with reduced manual labor. RFID may reduce or even eliminate the need to rely on paper receipts, reports, or manifests by capturing deposit data at the time of the initial touch point and using that captured data to populate all downstream front-end systems.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
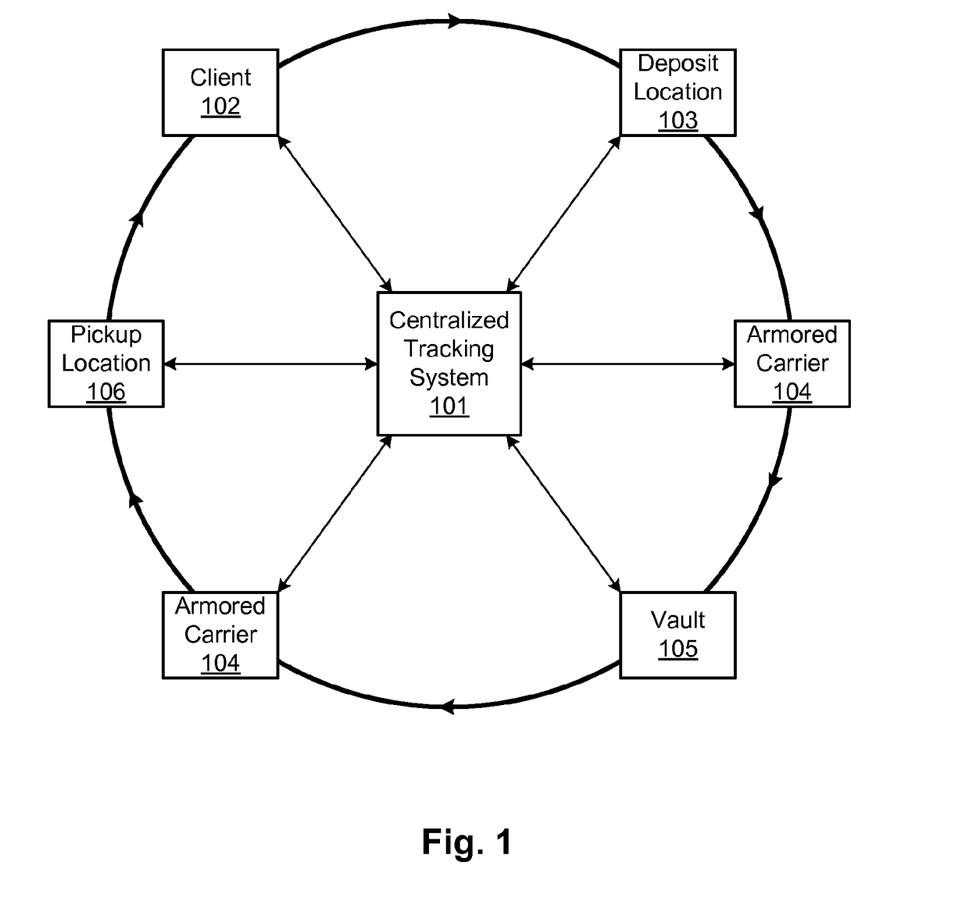
FIG. 1 is a graphical depiction of an illustrative cash supply chain for a deposit/withdrawal lifecycle, including a centralized tracking system.

FIG. 1 is a graphical depiction of an illustrative cash supply chain for a monetary item deposit/withdrawal lifecycle. In this example, a centralized tracking system 101 communicates with various parties, such as a bank client 102 or other internal and/or external customer, a deposit location 103, an armored carrier 104 or other transport service, a bank vault 105 or other deposit processing location, and a pickup location 106. Communication between centralized tracking system 101 and the various parties 102-106 may be performed across any one or more communication media. Examples of communication media include, but are not limited to, a network such as the Internet, a local-area network or LAN, a wireless LAN or WLAN, and/or a telephone network such as a landline telephone network and/or a cellular telephone network. Other examples of communication media include a dedicated landline link and/or satellite or other wireless link. While not explicitly shown, monetary items may be processed internally within a node (e.g., within bank vault 105). Consequently, each node may have a network within itself.

Centralized tracking system 101 may include at least one computing device and at least one computer-readable medium that, together, are configured to receive monetary package status reports from parties such as parties 102-106, maintain data representing the monetary package status, and generate reports and alert messages from that monetary package status data. A "computing device" as referred to herein includes any electronic, electro-optical, and/or mechanical device, or system of physically separate such devices, that is able to process and manipulate information, such as in the form of data. Non-limiting examples of a computing device includes one or more personal computers (e.g., desktop or laptop), servers, personal digital assistants (PDAs), ultra mobile personal computers, smart phones, cellular telephones, pagers, and/or a system of these in any combination. In addition, a given computing device may be physically located completely in one location or may be distributed amongst a plurality of locations (i.e., may implement distributive computing). A computing device may even be a mobile device. Centralized tracking system 101 may further support co-operation with other non-bank tracking systems.

A computing device typically includes both hardware and software. The software may be stored on a computer-readable medium in the form of computer-readable instructions. A computing device may read those computer-readable instructions, and in response perform various steps as defined by those computer-readable instructions. Thus, any functions attributed to a computing device as described herein may be defined by such computer-readable instructions read and executed by that computing device, and/or by any hardware (e.g., a processor) from which the computing device is composed.

The term "computer-readable medium" as used herein includes not only a single medium or single type of medium, but also a combination of one or more media and/or types of media. Such a computer-readable medium may store computer-readable instructions (e.g., software) and/or computer-readable data (i.e., information that may or may not be executable).

Referring again to FIG. 1, bank client 102 may include not only registered customers of a bank that have a financial account (e.g., checking or savings account) maintained by the bank, but also customers that do not have a financial account with the bank but are otherwise doing business with the bank. Clients may also be another bank or a bank agent or business partner including local, state, or federal governments, and may also be extended to include a chain of a bank's customer's customers. As will be discussed, bank client 102 may receive a notification of an event along the cash supply chain at a phone or terminal through a wireless network or the Internet.

Deposit location 103 is the location at which client 102 releases custody of the deposit (such as in the form of a monetary package). This custody may be released by, for instance, depositing the cash into a self-service monetary item handling device, or at a bank teller, or even at the client's own location where an armored carrier would pick up the deposit from the client. Pickup location 106 is the location at which client 102 receives custody of the monetary items (which may or may not be prepared by client 102 and which may be in the form of a monetary package), such as from an armored carrier, bank teller, or cash recycler.

Vault 105 is typically a secured location or device in a bank or customer's office where the deposit is processed. In the case of a vault in an armored carrier's or bank's facility, once the deposits are processed, currency or other monetary items are strapped for storage and distribution. A vault may not only process incoming monetary items but may also provide monetary items such as currency to clients. These requests for currency, commonly called "change orders," are generally standing orders for specific amounts that are sent on a specific schedule, but can be on-demand or non-standing orders that are requested for a specific time. With some embodiments, currency may be verified by the one transporting the currency. This may be because the carrier is trusted and in an appropriate liability agreement with the bank, or the bank owns a carrier. In that case, some or all of the funds may be verified (or trusted due to the device the funds came from) and re-used in the cash supply chain without going to the vault. For example, the carrier may use a hand-held device to check the next location to visit or receive notices that a site needs cash. The carrier may use the verified cash to fulfill the order.

Armored carrier 104 (which may be referred to as a "vendor") transports monetary packages between different stages along the cash supply chain typically in an armored vehicle. The physical transportation could be any type of transportation, however, including a courier or package delivery service with a secured package.

Parties 102-106 may communicate with centralized tracking system 101 over corresponding communications channels. Different types of communications channels may be supported. For example, centralized tracking system 101 may communicate with client 102 through a computer terminal (via the Internet) and/or a wireless telephone, with an armored carrier through a handheld scanner with a wireless communications interface, and with a bank employee through a work station (e.g., via an intranet). A communications channel may utilize different communications media, including a wired telephone channel, wireless telephone channel, and/or wide area channel (WAN).

Figure 2:
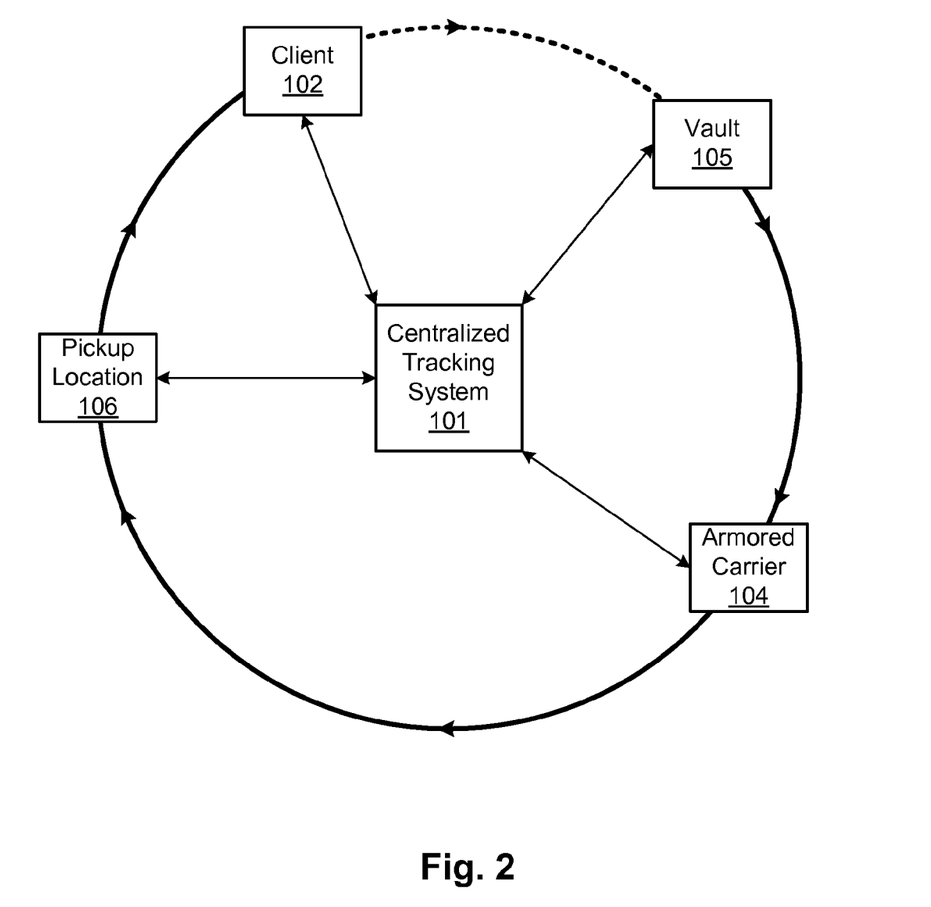
FIG. 2 is a graphical depiction of an illustrative cash supply chain for a change order lifecycle, including a centralized tracking system.

FIG. 2 is a graphical depiction of an illustrative cash supply chain for a change order lifecycle. A change order is a financial transaction in which a client (such as client 102) requests and receives a predefined sum in a predefined set of one or more denominations. For example, client 102 might request a particular amount of currency with X amount of ten dollar bills, Y amount of twenty dollar bills, and Z amount of one dollar bills. While any type of client may implement a change order, this type of transaction is particularly common for business clients that require a certain amount of currency in hand each day for their cash registers. With some embodiments, a change order may be initiated by the bank using forecasting systems for monetary item handling devices.

As can be seen in FIGS. 1 and 2, a monetary package transfers from party to party, with the exception of the broken line in FIG. 2 that indicates a request by client 102 rather than a physical transfer of a monetary package. Each time the monetary packages changes hands and/or changes physical locations, centralized tracking system 101 may be updated. A physical location may have two different nodes, or within the same node, of the cash supply chain. For example, monetary items are typically moved from receiving of a vault to a teller of the vault. In addition, any of these parties (or even other parties not shown) may at any time query centralized tracking system 101 to determine the current status, historical status, and planned future status of the monetary package. To aid in tracking monetary packages, each monetary package may physically include an identifying device having an associated identifier that is unique to that monetary package. The identifying device may be any device that stores human-readable and/or computer-readable information on some type of medium. Examples of such an identifying device include a radio-frequency identification (RFID) tag or other wirelessly readable tag, a bar code or other visual label, or printed ink made directly on or in the monetary package. The identifier itself may be made up of any one or more symbols that together make up a unique combination, such as one or more numbers, letters, icons, dots, lines, and/or any one-, two-, or higher-dimensional patterns.

Figure 3:
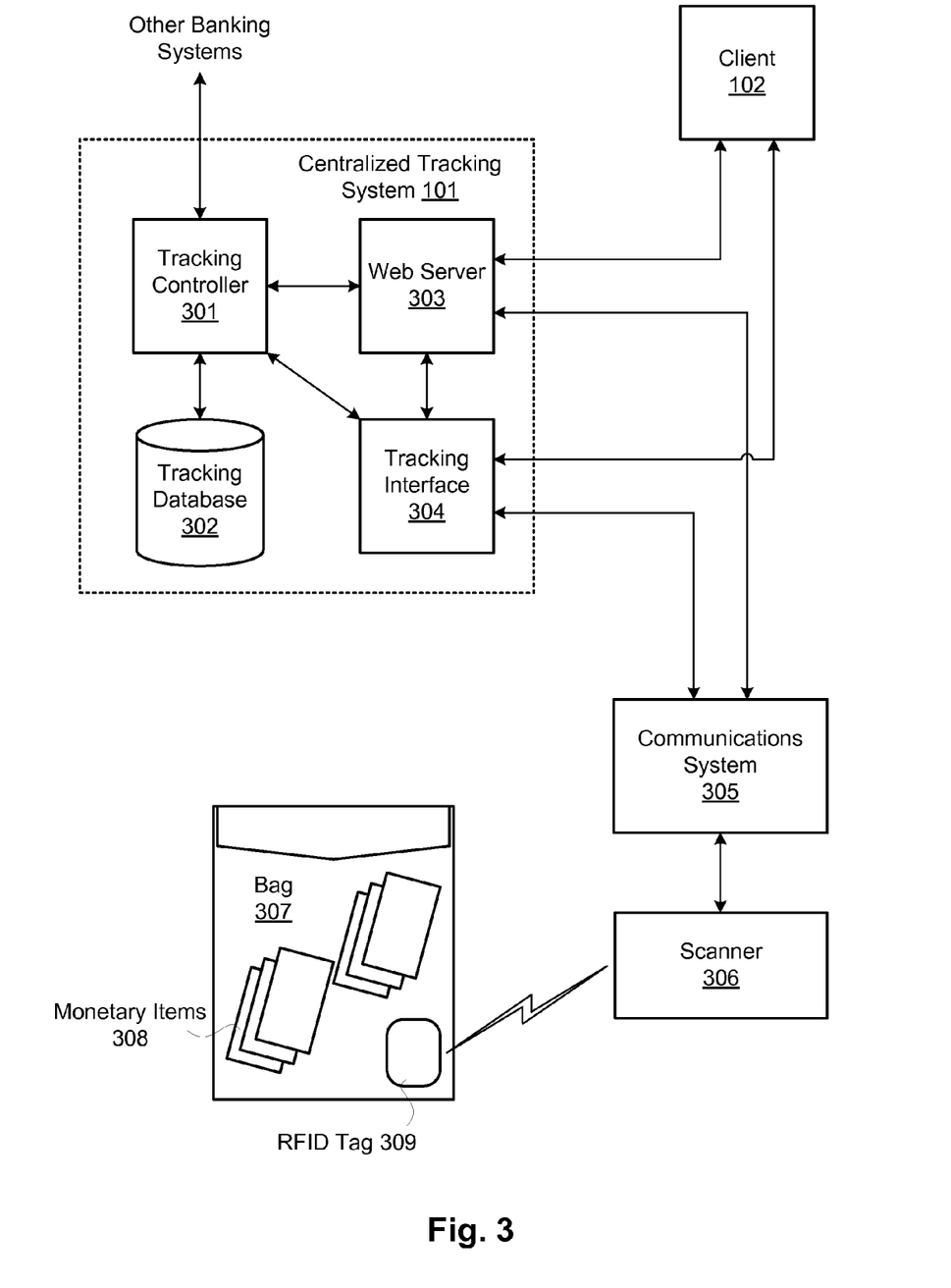
FIG. 3 is a functional block diagram of an illustrative monetary package tracking environment.

FIG. 3 is a functional block diagram of an illustrative monetary package tracking environment. In this example, centralized tracking system 101 is shown to include a tracking controller 301, tracking database 302, a web server 303, and a tracking interface 304. Each of units 301, 303, and 304 may be implemented as or otherwise include a computing device. It should be noted that the divisions between functional blocks in FIG. 3 is merely illustrative, and that the physical division of computing devices and other equipment may be different from the functional division. Moreover, some or all of the functional blocks may be combined or further subdivided functionally and/or physically.

Tracking database 302 may be implemented as or otherwise include a computer-readable medium for storing data. This data may be organized, for instance, as a relational database that is responsive to queries such as structured query language (SQL) queries. Tracking database 302 may be distributed and may collaborate with internal and/or external sources to fulfill the completeness of the data utilized for notifications.

In this example, tracking controller 301 may be configured to add, edit, update, delete, and query data stored in tracking database 302. The data stored in tracking database 302 may include, for instance, data indicating the current status of each of a plurality of monetary packages. For example, the data may indicate that a given monetary package is with a particular armored carrier, and that it was transferred to the armored carrier at a certain time on a certain date. The status data may be associated with the unique identifier of the relevant monetary package.

Web server 303 may be configured to generate an Internet web page that is accessible by client 102 and/or other parties. The web page may be used to query tracking database 302 via tracking controller 301. For example, a party using the web page may be able to enter an identifier associated with a monetary package. In response, web server 303 may request tracking controller 301 to query tracking database 302 (or alternatively web server 303 may generate the query itself) for that identifier. The query response is forwarded by tracking controller 301 to web server 303, and displayed on the web page for review by the party. The query response may include, for instance, the status data associated with the identifier. Many other types of query transactions are possible. In addition, updates, deletions, and additions may be made to the data in tracking database 302 via the web page generated by web server 303. For example, a party may desire to update status information about a particular monetary package via the web site, or may desire to add a new monetary package with a new identifier not previously included in tracking database 302.

Tracking interface 304 may be used as an alternative interface into tracking controller 301 and tracking database 302, without the need for an Internet web page. For example, data and queries may be provided to tracking controller 301 via tracking interface 304 using a short messaging system (SMS) message or other type of messaging from a cellular telephone.

FIG. 3 further shows an example of a communications system 305 (e.g., the computer system of armored carrier 104). Communications system 305 may be embodied as or otherwise include a computing device, and may further include or be coupled with a scanner 306 configured to read an identifier reader of a monetary package. Examples of scanner 306 may include an RFID scanner or an optical bar code reader. In this example, it will be assumed for the sake of discussion that scanner 306 is an RFID scanner and is therefore configured to read an RFID tag 309 that is attached to or contained inside a bag 307 that also contains a quantity of cash 308. Using such a setup, the third party may, for example, read the identifier stored in RFID tag 309 using RFID scanner 306 (which may be a handheld or fixed location device), forward that identifier to tracking interface 304 or web server 303 along with the current status of bag 307 (e.g., in custody of the bank vault at a certain time and date). This current status may be added to the data in tracking database 302 and associated with the identifier. Then, when that party or another party later queries tracking database 302 for the same identifier, the status of bag 307, including the most recent status discuss above, may be returned in response to the query.

The above discussion in connection with FIGS. 1-3 describes but a few examples of how monetary package tracking might be implemented. These and other implementations, as well as various features that may be provided in connection with monetary package tracking, will be discussed in further detail below.

Figure 4:
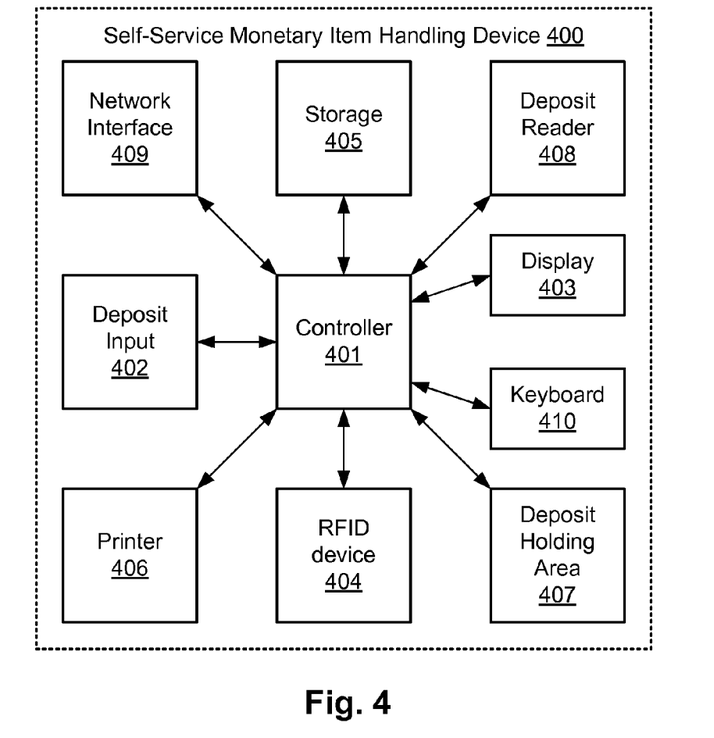
FIG. 4 is a functional block diagram of an illustrative remote ID equipped self-service monetary item handling device.

FIG. 4 is a functional block diagram of an illustrative self-service monetary item handling device 400. In this example, self-service monetary item handling device 400 includes a controller 401, a deposit input 402, a display 403, an RFID device 404, storage 405, a printer 406, a deposit holding area 407, a deposit reader 408, a network interface 409, and a keyboard 410.

Controller 401 may be or include, for example, a processor such as a microprocessor, or other circuitry, and/or may be embodied as a computing device. Controller 401 may control and/or coordinate the operations of self-service monetary item handling device 400.

Storage 405 may be embodied as any type of computer-readable medium, such as memory, tape drives, and/or hard drives, and may store data and software (computer-executable instructions) for use by controller 401 and/or by any other functional unit of self-service monetary item handling device 400. Any functions attributed to self-service monetary item handling device 400 and/or controller 401 as described herein may be defined by such computer-readable instructions read and executed by controller 401, and/or by any other hardware from which self-service monetary item handling device 400 is composed.

Network interface 409 may be used to communicate unidirectionally or bi-directionally with an external entity. Such communication may be via a direct line, such as a telephone connection, and/or via a network such as the Internet. The external entity may include, for instance, the bank, such as centralized tracking system 101. Thus, any data communicated between self-service monetary item handling device 400 and centralized tracking system 101 as described herein may be performed via network interface 409.

Deposit input 402 may be or include a slot for receiving deposits from self-service monetary item handling device customers. Deposit input 402 may further include a motor system designed to pull paper deposits into self-service monetary item handling device 400. The deposits entering deposit input 402 may pass through a deposit reader 408, which may include an optical imager (e.g., a camera or scanner) and/or a magnetic reader, for scanning/reading the deposits. Deposit reader 408 may recognize the deposits (e.g., what types of bills are being deposited) using known techniques, and may store data about the deposits (including optical images) into storage 405.

Once the deposits have been received and read by deposit reader 408, the deposits may be placed in deposit holding area 407. Deposit holding area 407 may include one or more deposit bins, such as one for paper currency and another for checks.

Printer 406 and display 403 may be used for providing information to the user of self-service monetary item handling device 400, in a conventional manner.

RFID device 404 may include an RFID tag and/or an RFID scanner for reading other RFID tags located within (e.g., for reading RFID tags on the deposit bags in deposit holding area 407) and/or external to self-service monetary item handling device 400 (e.g., for reading RFID badges of armored carriers or other authorized persons servicing self-service monetary item handling device 400).

Figure 5:
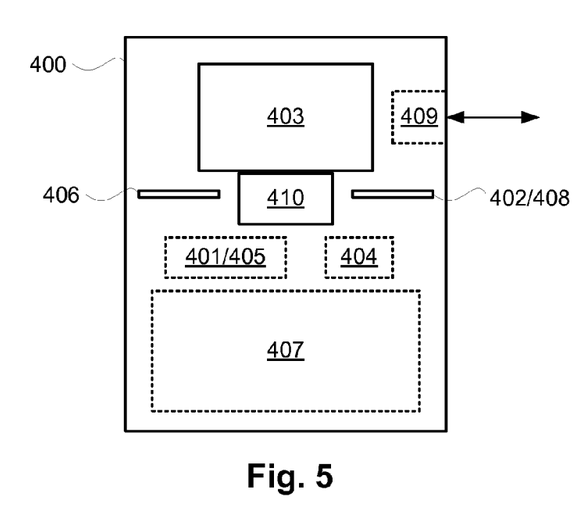
FIG. 5 shows an illustrative physical layout of the self-service monetary item handling device of FIG. 4.

FIG. 5 shows an illustrative physical layout of the various elements of self-service monetary item handling device 400. Elements shown in broken lines are contained within the housing of self-service monetary item handling device 400 in this example. In this example, deposit holding area 407 is located within the housing, but its contents (e.g., deposit bins) may be physical accessible to a servicer via a safe door or removable panel in the housing. Physical access to the contents of deposit holding area 407 may be controlled manually by the servicer (e.g., via a lock and key) and/or via control by controller 401. For instance, controller 401 may control an electronic lock on deposit holding area 407 responsive to appropriate user input and/or RFID identification from the servicer.

Figure 6:
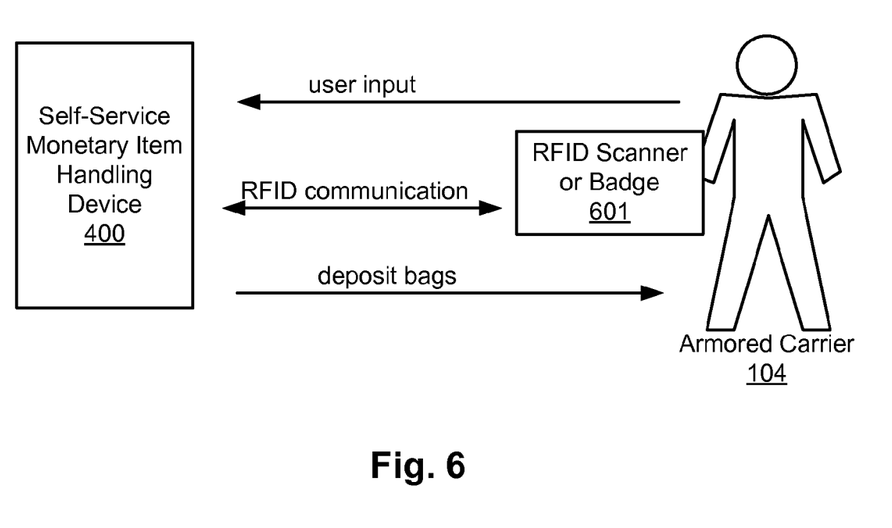
FIG. 6 shows illustrative servicing transactions using the self-service monetary item handling device of FIG. 4.

FIG. 6 shows illustrative servicing transactions that may occur between a servicer (in this example, armored carrier 104) and self-service monetary item handling device 400. As shown, armored carrier 104 or another servicer such as a banking center associate may provide user input to self-service monetary item handling device 400. The user input may be in the form of input to keyboard 410 and/or via input to display 403 where display 403 is a touch-sensitive display. Other transactions may include unidirectional or bi-directional RFID communications, such as between RFID device 404 and an RFID-enabled badge 601 or other object in the possession of armored carrier 104. Using one or both of user in put and RFID or other type of wireless communications, the servicer may be authenticated. Once armored carrier 104 has been authenticated, armored carrier 104 may further retrieve the deposit bags or other types of monetary packages contained within deposit holding area 407.

These transactions may operate as in the following examples. In one example, armored carrier 104 may approach self-service monetary item handling device 400 to begin the servicing process. As armored carrier 104 walks up to self-service monetary item handling device 400, RFID device 404 may capture the data on armored carrier's 104 RF-enabled ID badge 601, which stores an identifier uniquely identifying armored carrier 104. RFID device 404 may read this identifier from badge 601 and associate that identifier with the unique identifier of self-service monetary item handling device 400 (as may be stored in RFID device 404 and/or storage 405), the current date, the current time, an identifier that uniquely identifies self-service monetary item handling device 400 from other self-service monetary item handling devices, and/or the location of self-service monetary item handling device 400, self-service monetary item handling device 400 may also authenticate the servicer such as by comparing the received identifier of badge 601 with a pre-stored set of authorized identifiers (e.g., in storage 405) to determine whether badge 601 identifies armored carrier 104 as being an authorized servicer of self-service monetary item handling device 400.

Authentication may also require user input, such as by requiring a pass code entered via keyboard 410. If authenticated, then armored carrier 104 may be allowed to fully access the servicing menu of self-service monetary item handling device 400, and select the deposit pull function from the menu (e.g., using keyboard 410 and/or display 403).

In response to the selection, self-service monetary item handling device 400 may automatically push, via network interface 409, the relevant deposit data collected using RFID device 404 to downstream processes at the bank, such as RFID tag identifiers on the deposit bags in deposit holding area 407 as well as their contents, and the other information collected and associated with the identifier of badge 601. The downstream processes may include, e.g., centralized tracking system 101. All this may occur in response to a simple selection of a function on the servicing menu. Then armored carrier 104 may begin the deposit pull.

Information about the contents of the deposit bags may have been already determined as each deposit is made. This information may be obtained, for instance, using deposit reader 408, which may optically or otherwise read the currency bills, checks, and any other deposits being inserted into deposit input 402. In addition, where deposits already include their own RFID tags, RFID device 404 may read the identifiers from those RFID tags and record the fact that deposits with those particular identifiers have been placed into self-service monetary item handling device 400. All information obtained about the deposits may be stored in storage 405 until it is ready to be output via display 403, via printer 406, via RFID device 404, and/or via network interface 409.

As another example, self-service monetary item handling device 400 may be embodied as a banking center serviced self-service monetary item handling device, i.e., located within a banking center. In this case, a banking center associate (e.g., a banking teller) may approach self-service monetary item handling device 400 to begin the servicing process. Instead of RFID device 404 being located inside self-service monetary item handling device 400 and reading the deposits, an RFID hand held scanner such as RFID scanner 306 may be used by the banking center associate (or armored carrier or other servicer) to read the RFID identifiers from the deposits in deposit holding area 407, and/or the RFID identifier of self-service monetary item handling device 400. Additionally or alternatively, any of the information in the previous example that was transmitted via network interface 409 directly or indirectly to centralized tracking system 101 may instead be transmitted via RFID device 404 to RFID scanner 306. RFID scanner 306 may, in turn immediately or on a deferred basis transfer this information directly or indirectly to centralized tracking system 101 via communications system 305 and tracking interface 304 and/or web server 304. Thus, RFID scanner 306 may be used not only for the previously-described purposes in connection with FIG. 3, but also for self-service monetary item handling device servicing, such as for tracking incoming cash orders, self-service monetary item handling device cash replenishment, and deposit assets.

As an alternative to using RFID scanner 306, the banking center associate may walk up to self-service monetary item handling device 400, scan his/her RFID-enabled badge, and scan cash replenishment straps, check bags, and monetary items and deposit pull receipts. The resulting scanned identifiers and the data associated with those identifiers may be instantly transmitted to centralized tracking system 101, which may associate the received identifiers and data regarding the banking center associate, self-service monetary item handling device 400 unique identifier, the date, the time, the location, and self-service monetary item handling device cash replenishment and deposit pull contents.

Thus, systems, methods, and software for at least partially automating self-service monetary item handling device servicing has been described. Many variations on the described examples are possible. For example, although RFID has been discussed as a means for communication between two entities, other types of wireless or non-wireless communications are possible, such as BLUETOOTH, infra-red transmissions, or optical bar code reading.

The invention claimed is:

1. A method performed by a self-service monetary item handling device, the method comprising:
receiving a plurality of monetary deposits;
moving the plurality of received monetary deposits to a locked deposit holding area of the self-service monetary item handling device, such that the deposits held in the deposit holding area are contained within a plurality of deposit bags, each of the deposit bags having a radio frequency identification (RFID) tag;
reading an identifier from each of the RFID tags;
wirelessly receiving an identifier of a servicer;
comparing the received identifier of the servicer with a set of authorized identifiers pre-stored in the self-service monetary handling device;
authenticating the identifier of the servicer;
responsive to the identifier of the servicer being authenticated, providing the servicer with physical access to the deposit bags contained within the self-service monetary item handling device and wirelessly transmitting the identifiers read from the RFID tags;
receiving a user input in addition to the identifier, wherein the providing comprises providing the servicer with physical access to the deposit bags responsive to the user input; and
wherein wirelessly receiving comprises wirelessly receiving the identifier of the servicer from an RFID device, and wherein transmitting comprises transmitting the identifiers read from the RFID tags to the RFID device.

2. The method of claim 1, wherein wirelessly receiving comprises wirelessly receiving using radio frequency identification (RFID) technology.

3. The method of claim 1, wherein the user input comprises a press of a button on the self-service monetary item handling device.

4. The method of claim 1, wherein the self-service monetary item handling device comprises an automated teller machine (ATM).

5. The method of claim 1, wherein providing the servicer with physical access to the deposit bags comprises causing the deposit holding area to become unlocked.

6. The method of claim 1, wherein providing the servicer with physical access to the deposit bags comprises providing the servicer with physical access to the RFID tags.

7. A self-service monetary item handling device, comprising:
a deposit input device configured to receive a plurality of monetary deposits from outside of the self-service monetary item handling device, each of the monetary deposits having a radio frequency identification (RFID) tag;
a lockable deposit holding area configured to receive the plurality of monetary deposits from the deposit input device, and to hold the received one or more monetary deposits in a plurality of bins;
an RFID device configured to read an identifier from each of the plurality of RFID tags and to wirelessly receive an identifier of a servicer;

a controller configured to compare a set of authorized identifiers pre-stored in the self-service monetary handling device and authenticate the identifier of the servicer, and in response to the authenticating, to cause the deposit holding area to become unlocked to provide physical access to the monetary deposits held in the plurality of bins and to cause the RFID device to wirelessly transmit the identifiers read from the RFID tags;

receiving a user input in addition to the identifier, wherein the providing comprises providing the servicer with physical access to the deposit bags responsive to the user input; and wherein the RFID device is configured to wirelessly receive the identifier of the servicer from an external RFID device located outside the self-service monetary item handling device, and to transmit the identifiers read from the RFID tags to the external RFID device.

8. A self-service monetary item handling device, comprising:

a deposit input device configured to receive a plurality of monetary deposits from outside of the self-service monetary item handling device;

a lockable deposit holding area configured to receive the plurality of monetary deposits from the deposit input device, and to hold the received one or more monetary deposits in a plurality of deposit bags, each of the deposit bags containing a radio frequency identification (RFID) tag;

an RFID device configured to read an identifier from each of the plurality of RFID tags and to wirelessly receive an identifier of a servicer;

a controller configured to compare a set of authorized identifiers pre-stored in the self-service monetary handling device and authenticate the identifier of the servicer, and in response to the authenticating, to cause the deposit holding area to become unlocked to provide physical access to the plurality of deposit bags and to cause the RFID device to wirelessly transmit the identifiers read from the RFID tags;

receiving a user input in addition to the identifier, wherein the providing comprises providing the servicer with physical access to the deposit bags responsive to the user input; and wherein the RFID device is configured to wirelessly receive the identifier of the servicer from an external RFID device located outside the self-service monetary item handling device, and to transmit the identifiers read from the RFID tags to the external RFID device.

9. The self-service monetary item handling device of claim 8, wherein the self-service monetary item handling device comprises an automated teller machine (ATM).

10. A method performed by a self-service monetary item handling device, the method comprising:

receiving a plurality of monetary deposits;

moving the plurality of received monetary deposits to a locked deposit holding area of the self-service monetary item handling device, such that the deposits held in the deposit holding area are held within a plurality of bins, each of the monetary deposits having a radio frequency identification (RFID) tag;

reading an identifier from each of the RFID tags;

wirelessly receiving an identifier of a servicer;

comparing the received identifier of the servicer with a set of authorized identifiers pre-stored in the self-service monetary handling device;

authenticating the identifier of the servicer;

responsive to the identifier of the servicer being authenticated, providing the servicer with physical access to the monetary deposits held in the plurality of bins and wirelessly transmitting the identifiers read from the RFID tags;

receiving a user input in addition to the identifier, wherein the providing comprises providing the servicer with physical access to the deposit bags responsive to the user input;

wherein wirelessly receiving comprises wirelessly receiving the identifier of the servicer from an RFID device, and wherein transmitting comprises transmitting the identifiers read from the RFID tags to the RFID device.

11. The method of claim 10, wherein wirelessly receiving comprises wirelessly receiving using radio frequency identification (RFID) technology.

12. The method of claim 10, wherein the user input comprises a press of a button on the self-service monetary item handling device.

13. The method of claim 10, wherein the self-service monetary item handling device comprises an automated teller machine (ATM).

14. The method of claim 10, wherein providing the servicer with physical access to the deposit bags comprises causing the deposit holding area to become unlocked.

15. The method of claim 10, wherein providing the servicer with physical access to the deposit bags comprises providing the servicer with physical access to the RFID tags.

* * * * *